UNITED STATES PATENT OFFICE.

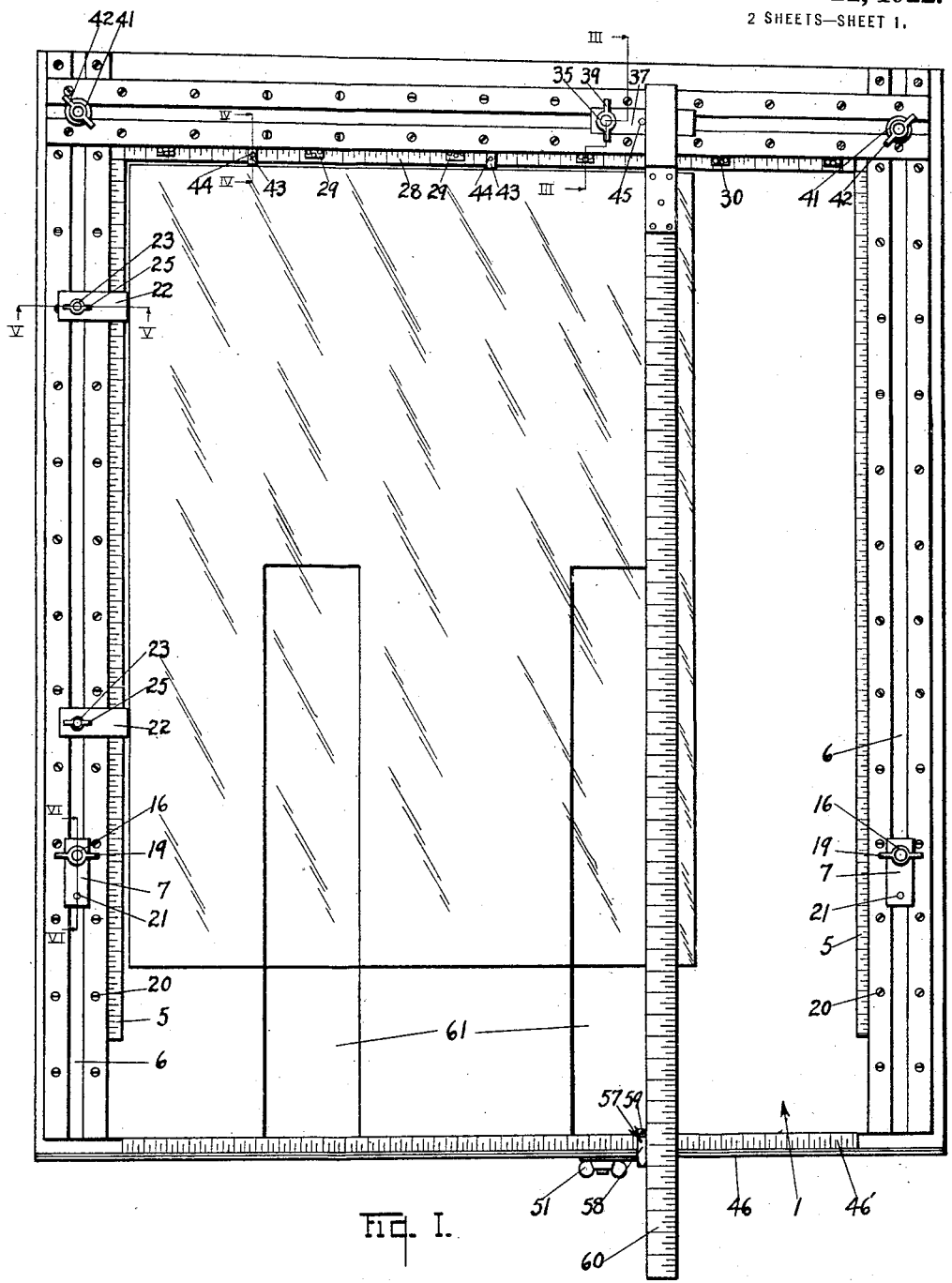

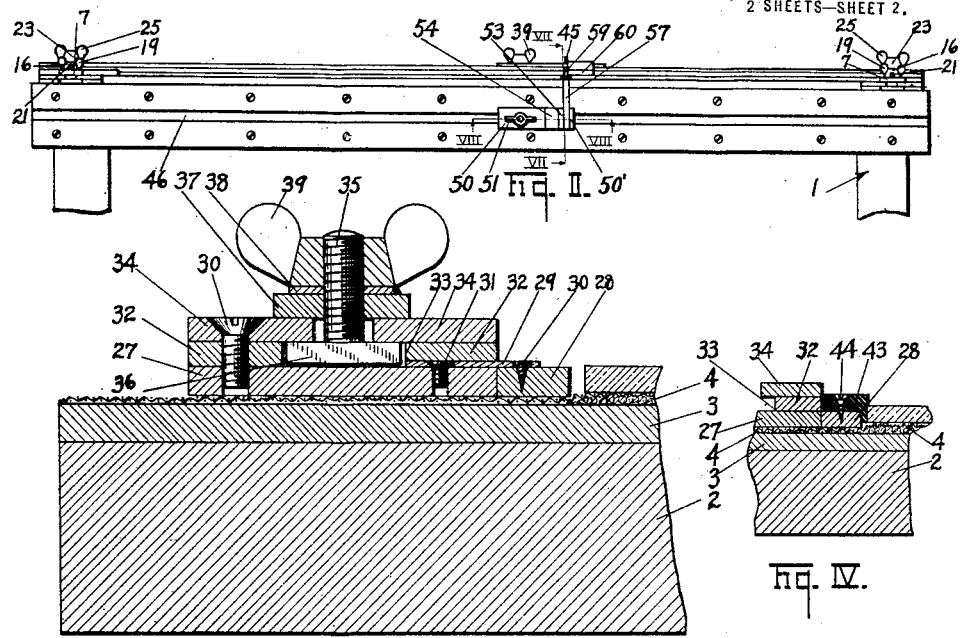
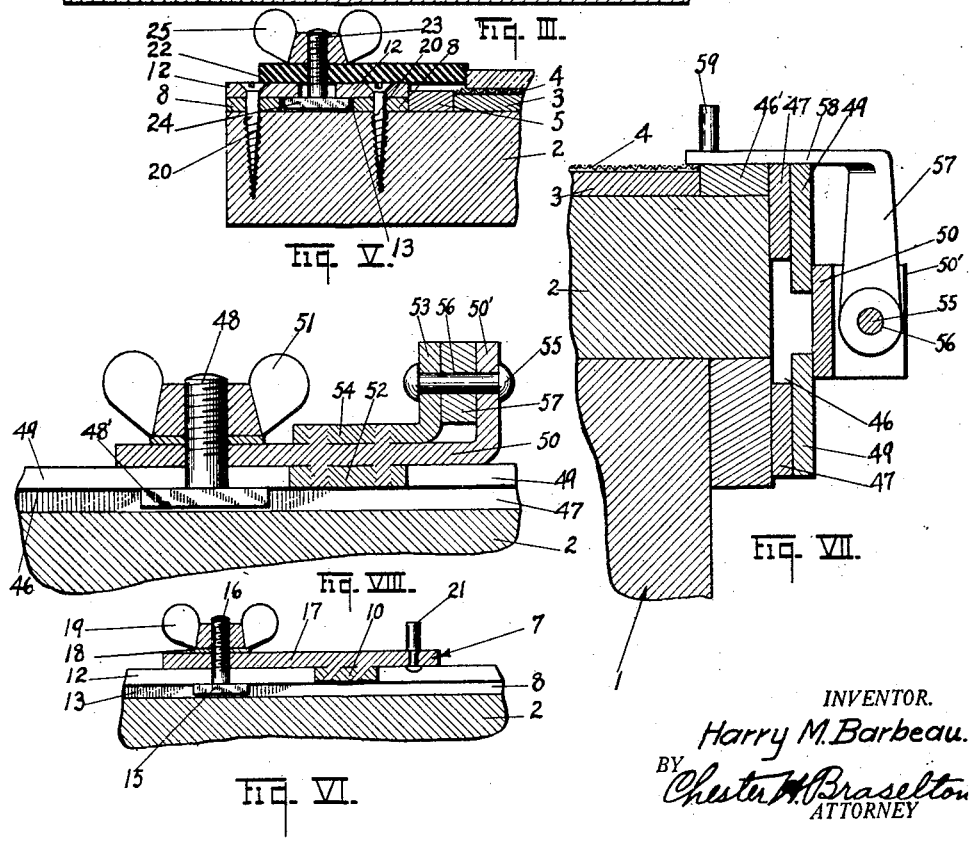

HARRY M. BARBEAU, OF TOLEDO, OHIO, ASSIGNOR TO THE WILLYS-OVERLAND COMPANY, OF TOLEDO, OHIO, A CORPORATION OF OHIO.

GLASS-CUTTING TABLE.

1,410,153.           Specification of Letters Patent.      Patented Mar. 21, 1922.

Application filed January 23, 1919. Serial No. 272,677.

*To all whom it may concern:*

Be it known that I, HARRY M. BARBEAU, residing at Toledo, county of Lucas, and State of Ohio, have invented certain new and useful Improvements in Glass-Cutting Tables, of which I declare the following to be a full, clear, and exact description.

My invention relates to glass cutting tables, particularly those which are designed for the purpose of cutting a plurality of plates of substantially equal size.

One object of the invention is to provide a device of this character having a plurality of measuring guides for guiding and positioning the glass and readily determining the size of the plates to be cut.

A further object of the invention is to provide a plurality of sliding stops for readily determining the location of the line along which the glass is to be cut.

A further object of the invention is to provide means whereby the sliding stops may be readily adjusted relative to the glass cutting table, and firmly clamped in a plurality of adjusted positions.

A further object of the invention is to provide a device of this character having a guide measure which is capable of adjustment relative to the table in such a manner as to position the glass to be operated upon where it will be most readily accessible to the operator.

A further object of the invention is to provide a plurality of spacing blocks designed to contact with the edge of the glass which is to be cut and thus better position the same for cutting.

A further object of the invention is to provide a table of this character so constructed as to enable the glass to be readily positioned thereon and removed therefrom.

A further object is to provide a device of this character which shall be of simple construction and efficient in operation.

Further objects of this invention relate to economies of manufacture and details of construction as will hereinafter appear from the detailed description to follow.

The objects of the invention are accomplished in one instance by the devices and means described in the following specifications, but it is evident that the same may be varied widely without departing from the scope of the invention as pointed out in the appended claims.

A structure constituting one embodiment of the invention, which may be the preferred, is illustrated in the accompanying drawing forming a part hereof in which:

Fig. I is a top plan view of the table showing the relative position of the operating parts when properly assembled for the purpose of cutting a plate of glass.

Fig. II is a side view of the table taken from the front side thereof as shown in Fig. I, and illustrating the relative position of the grooved guide positioned upon the side of the table.

Fig. III is a vertical sectional view taken along the line III—III of Fig. I.

Fig. IV is a vertical sectional view taken along the line IV—IV of Fig. I.

Fig. V is a vertical sectional view taken along the line V—V of Fig. I.

Fig. VI is a vertical sectional view taken along the line VI—VI of Fig. I.

Fig. VII is a vertical sectional view taken along the line VII—VII of Fig. II.

Fig. VIII is a vertical sectional view taken along the line VIII—VIII of Fig. II.

Like parts are indicated by like reference characters in the several views.

In industries where it is necessary to cut a considerable number of plates of glass of the same or substantially equal size, it has been found to be highly desirable to provide a table having a plurality of adjustable stop members which are capable of being positioned at different points relative to the surface of the table, and securely clamped in a plurality of adjusted positions to provide stops for the usual cutting ruler. A table provided with a plurality of such adjustable stop members is capable of greatly facilitating the operation of cutting the glass into plates of substantially equal size, in that the stop members having once been arranged and positioned for cutting a plate of a certain size they may be clamped in that position and the various plates operated upon successively without the necessity of carefully measuring to determine the position of the cutting ruler before cutting each plate.

In the drawings similar reference characters refer to corresponding parts, and the sectional views are taken looking in the direction of the small arrows at the ends of the section lines.

Referring to the drawings, 1 indicates the cutting table which is preferably of rectangular form, and provided along its edges with a plurality of measuring strips or guides for assisting in quickly laying out the size of the plate which is to be cut. The table 1 comprises a bed portion 2 having a top portion 3 positioned thereon, the top portion 3 being provided with a plane upper surface upon which the glass is adapted to be positioned, the same being provided with a covering 4 of felt or other suitable material for the purpose of better protecting the glass from injury.

Mounted upon each side edge of the table is a measuring strip 5, and a grooved guide 6, which are substantially identical in construction and arrangement upon the two opposite sides of the table. Each of the grooved guide members 6 is provided with a sliding stop 7 adapted to slide therein and be firmly clamped in a plurality of adjusted positions longitudinally of the grooved guide. Each of the grooved guides comprises a pair of spacing plates 8 adapted to be positioned in such a manner that their inner edges are parallel to each other throughout the length of the plates, thus forming a guide groove 13 of uniform width throughout its length. Mounted upon the upper surface of each of the spacing plates and extending in a direction longitudinally of the same are a pair of cover plates 12, each being of greater width than the corresponding spacing plate and having their inner edges spaced a sufficient distance from each other to provide a longitudinally extending groove for a purpose hereinafter to be described. The inner edges of the two cover plates are spaced from each other a uniform distance, thus partially enclosing the groove 13 within which is adapted to slidably fit the squared head 15 of the bolt 16. The bolt 16 extends upwardly between the inner edges of the cover plates passing through the base plate 17 of the sliding stop 7, and adapted to receive the washer 18 and a wing nut 19 upon its upper extremity. The top plates 12 and spacing plates 8 are secured to each other and to the bed portion 2 of the table by means of screws or the like 20. The guide measures 5 are firmly secured in position by being held between the inner spacing plate 8 and the edge of the top portion 3 of the table as shown in Fig. V. By means of the spacing plates 8 and the cover plates 12 an open ended groove 13 is provided which is of uniform width throughout its length and is adapted to slidably receive the squared head 15 of the bolt 16 in such a manner as to permit the same to freely slide throughout the length of the groove. The sliding stop 7 may be clamped in any desired position throughout the length of the groove by threading down the wing nut 19 so as to clamp the base portion 17 of the sliding stop upon the inwardly extending edges of the cover plates. The plate 17 is provided upon its under surface with a guide block 10 secured thereto in any suitable manner, as by being spot welded thereto, the said blocks being of sufficient width to fit closely between the inner edges of the corresponding cover plates and serve to prevent angular movement of the plate 17 in a horizontal direction. Pin 21 extending upwardly from the upper surface of the base portion of each of the sliding stop members 7, serves as a stop for properly positioning the cutting ruler in such a manner as to determine the line along which the glass is to be cut. By properly arranging the position of the opposite sliding stop members 7, and firmly clamping them in place, the cutting ruler may be readily positioned for cutting a plate of glass at any desired angle, and a plurality of plates may thus be cut without changing the position of the sliding stop members.

A plurality of spacing blocks 22 are adapted to be slidably secured in either one of the groove guides 6 by means of bolts 23, each of which is provided with a square head 24, similar to the squared head 15 of the bolt 16 and adapted to slide in a similar manner within the groove 13. A wing nut 25 is adapted to be threaded upon the upper extremity of each of the bolts 23 for the purpose of securely clamping each of the spacing blocks securely in position at spaced points throughout the length of the grooved guides. These spacing blocks are preferably formed of fibrous material, but may if desired be made of wood, or hard rubber, or other similar substance, and adapted to contact at their outer edges with one edge of the glass plate for the purpose of properly positioning the same with respect to the corresponding guide measure. The purpose of using the spacing blocks is to better position the glass with respect to the guide measure since the edge of the glass occasionally presents inequalities which would prevent the plates from properly fitting against a straight edge. The spacing blocks are preferably formed of fibrous material or other similar substance so as to prevent chipping of the edge of the glass plate as it is pressed against the outer edges of the spacing blocks.

Slidably mounted upon one end of the table and extending transversely thereof such a distance as to be capable of passing between the oppositely positioned parallel guide measures 5 is a base plate 27 having secured to one edge thereof a guide measure 28, of substantially the same length as the base plate, and attached to the base plate by means of connecting plates 29 which are adapted to rest upon the upper surfaces of the base plate and guide measures, and are secured to the same by means of screws 30 and 31.

Positioned upon the upper surface of the base plate are a pair of spacing plates 32 having their inner edges parallel to each other and spaced apart at sufficient distance to provide a groove 33 therebetween. A cover plate 34 rests upon the upper surface of each of the said spacing plates, the inner edge of each of said cover plates extending beyond the inner edge of the corresponding spacing plate, the inner edges of the said cover plates being parallel to each other, and partially covering the groove 33 formed between the inner edges of the spacing plates. A bolt 35 is provided with a squared head 36 which is adapted to slidably fit within the groove 33 and be capable of movement therein. A sliding stop member 37, similar to the sliding stops 7 positioned in the longitudinally extending grooves, is positioned upon the upper surfaces of the cover members 34, the bolts 35 passing through the said stop member and being provided with a washer 38 and wing nut 39 for firmly clamping the sliding stop member 37 in any desired position throughout the length of the groove 33. The spacing plates 32 and cover plates 34 extend beyond the ends of the base plates a sufficient distance to overlie the groove guides 6 extending along the side edges of the table. A bolt 41 provided with a squared head similar to the squared head 15 of the bolt 16, is positioned in each end of the sliding member supported by the base 27, the squared head of the bolt 41 being adapted to lie within and slidably move in the grooved guide 6 upon each side of the table. A wing nut 42 is threaded upon the upper extremity of each of the bolts 41 for the purpose of clamping the slidable frame in a plurality of adjusted positions relative to the table. A plurality of spacing blocks 43, formed of similar material to that employed in the spacing blocks 22 are secured to the upper surface of the guide measure 28 and overlie the inner edge thereof, as shown in Fig. IV, being secured to the upper surface of the guide measure by means of screws 44. The purpose of these spacing blocks is to provide an abutment for the edge of the glass plate which will prevent chipping or breaking of the plate, and properly align the edge of the plate with the guide measure 28. It will be clear from the above description that the base plate 27 and the frame carried thereby are readily movable in a direction longitudinally of the table, and can be secured in adjusted position at a plurality of different points in such a manner as to properly position the glass which is to be cut within convenient reach of the operator.

The sliding stop 37 is provided with an upwardly extending pin 45, similar in all respects to pins 21 with which the sliding stops 7 are provided.

At the opposite end of the table from which is positioned the frame carried by the bed plate 27 is a fixed guide measure 46', the upper surface of which is substantially flush with the top surface of the table, and which is firmly secured to the base portion 2 in any desired manner. Upon the side edge of the table adjacent to the fixed guide measure 46' is a guide groove 46 formed in a manner similar to the guide groove 6. A pair of spacing plates 47 are secured to the side edge of the table in such a manner that their inner edges are parallel with each other and spaced a sufficient distance apart to accommodate the squared head 48' of a bolt 48. A cover plate 49 is secured to the outer surface of each of the spacing plates 47, the said cover plates having their inner edges overlapping the inner edges of the corresponding spacing plates and spaced from each other a sufficient distance to permit the bolt 48 to pass therebetween. The bolt 48 is adapted to pass through an opening formed in a sliding plate 50, and by means of a wing nut 51 clamp the sliding plate in a plurality of adjusted positions through the length of the groove 46. The sliding plate 50 is provided upon one side thereof with a guide block 52, secured thereto in any desired manner as by being spot welded, the said guide block being of sufficient width to fit closely within the opening between the inner edges of the cover plates 49 and thus prevent angular movement of the sliding block 50. The sliding block 50 is provided with an angularly extending portion 50' formed at one end thereof which extends in a direction parallel to an angularly extending portion 53 of a plate 54, which plate is firmly secured to the outer surface of the sliding block 50 in any suitable manner, as by being spot welded thereto. A bolt or rivet 55 is adapted to extend through registering openings formed in the angular extensions 50' and 53 and an opening 56 formed in one end of a bent arm 57. By means of this construction the bent arm 57 is pivotally mounted within the offset portions 50' and 53 in such a manner as to freely rotate upon the bolt or rivet 55 while being held from angular movement with respect to the bolt by fitting closely within the inner surface of the outturned extensions 50' and 53. The bent arm 57 is provided with a portion 58 extending at substantially right angles to the main portion thereof, the parts being so arranged as to permit the angular portion 58 to lie substantially flat with the upper surface of the table when turned to the position shown in Fig. VIII. A pin 59 is secured in the angular portion 58 in such a manner as to extend upwardly therefrom and is adapted to cooperate with the pin 45 extending upwardly from the base portion of the sliding stop member 37 to serve as a stop for properly positioning the cutting ruler 60 serving as a guide for determining the line along which the glass is to be cut. The top portion of the table is provided with a pair of longitudinally extending openings 61 so positioned as to facilitate the positioning of the glass upon the top of the table in proper position to be operated on, and to facilitate removal of the glass after it has been cut.

The operation of the device is as follows. The guide measures 5 and corresponding guide grooves 6 extending longitudinally of the table upon the side edges thereof are firmly secured in position relative to the top portion of the table as well as the guide measure 46' and the corresponding guide groove 46 positioned upon the side edge of the table upon the end thereof which is occupied by the guide measure 46'. The base plate 27 and the frame carried thereby are slidably mounted upon the top surface of the table and capable of being secured in a plurality of adjustable positions by means of the bolts 41 and nuts 42. When a plurality of glass plates of substantially the same size are to be cut the spacing blocks 22 are properly positioned with respect to each other so as to retain the inner edge of the plate a uniform distance from the corresponding guide measures 5 and securely clamped in position by means of the nuts 25. The movable frame is then positioned in such a manner as to maintain the glass which is to be cut in the most favorable position for the operator and securely clamped in place by means of the nuts 42. The sliding stops 7, 45 and 50 are arranged in proper position depending upon the size of the plate which is to be cut and firmly clamped in place within their corresponding guide grooves. The glass plate which is to be cut may then be placed upon the top of the table with its inner edges contacting against the outer edges of the spacing blocks 22 and 43. These series of spacing blocks are so positioned relative to the corresponding guide measures as to properly align the inner edges of the glass plate with the edges of the guide measures. The operator may then slide the guide ruler into contact with the upwardly extending pins 45 and 59 which serves to properly position the ruler so that its edge determines the line along which the glass is to be cut. In a similar manner the pins 21 extending upwardly from the base members 17 of the sliding stops 7 are adjusted so as to position the guide ruler for the purpose of determining the line along which the glass is to be cut upon the adjoining side of the plate. It will be evident that when the parts are once secured in proper position for cutting a plate of a certain size they may remain in that position of adjustment so long as that size of plate is to be cut and consequently avoid the necessity of carefully measuring each plate before cutting the same. It will be apparent that one or more edges of the plate may be cut with any desired curve or at any desired angle by employing a guide ruler having one edge thereof embodying the desired curve and by properly positioning the sliding stops in such a manner that they will suitably co-operate with the guide ruler.

While I have shown and described in considerable detail a specific embodiment of my invention, it is to be understood that this showing and description is illustrative only and for the purpose of rendering my invention more clear, and that I do not regard the invention as limited to details of construction illustrated or described, nor any of them, except in so far as I have included such limitations within the terms of the following claims, in which it is my intention to claim all novelty inherent in my invention broadly as well as specifically.

What I claim as new and desire to secure by Letters Patent is:

1. In a glass cutting table, a stationary guide measure, a slidable guide measure, a slidable stop co-operating with each guide measure, means for securing said slidable stops in fixed position, and means the position of which is limited by the slidable stops for determining the line along which the glass is to be cut.

2. In a glass cutting table, fixed and movable guide measures carried by said table, a slidable stop co-operating with each guide measure, and means on each stop for determining the lines along which the glass is to be cut.

3. In a glass cutting table, a plurality of guide measures, one of said guide measures being mounted for slidable movement, a slidable stop co-operating with each guide measure and adapted to be locked in a plurality of positions relative thereto, and means on each stop for determining the line along which the glass is to be cut.

4. In a glass cutting table, fixed and movable guide members carried by said table, a grooved guide extending in a direction parallel to the direction of each guide measure, a slidable stop mounted for sliding movement in each grooved guide and co-operating with the corresponding guide measure, and means on each stop for determining the line along which the glass is to be cut.

5. In a glass cutting table, a plurality of guide measures one of said measures being adjustable with respect to the table, a slidable stop co-operating with each guide measure, and means on each stop for determining the lines along which the glass is to be cut.

6. In a glass cutting table, a plurality of guide measures one of said guide measures being adjustable with respect to the table, a slidable stop co-operating with each guide measure and adapted to be fixed in a plurality of positions relative thereto, and means on each stop for determining the line along which the glass is to be cut.

7. In a glass cutting table, a plurality of guide measures one of said guide measures being adjustable with respect to the table, a grooved guide extending in a direction parallel to the direction of each guide measure, a slidable stop mounted for sliding movement in each grooved guide and co-operating with the corresponding guide measure, and means on each stop for determining a line along which the glass is to be cut.

8. In a glass cutting table, a plurality of guide measures, a plurality of spacing blocks co-operating with one of the guide measures for properly positioning one edge of the glass with respect thereto, and adjustable means for determining the line along which the glass is to be cut.

9. In a glass cutting table, a plurality of guide measures one of said guide measures being adjustable, a plurality of spacing blocks co-operating with a stationary guide measure for properly positioning one edge of the guide with respect thereto, and means for determining the line along which the glass is to be cut.

10. In a device of the class described, a glass cutting table provided with an elongated opening therein parallel to one edge of the table to facilitate the removal of glass therefrom, and guide measures arranged adjacent the edges of the table.

11. In a device of the class described, a glass cutting table provided with an elongated opening therein parallel to one edge of the table to facilitate the removal of glass therefrom, and guide measures arranged adjacent the edges of the table one of said guide measures being adjustable.

12. In a glass cutting table, a plurality of guide measures one of said guide measures being adjustable with respect to the cutting table, a plurality of spacing blocks co-operating with the adjustable guide measure, and means for determining the line along which the glass is to be cut.

13. In a device of the class described, a table, a slidable guide measure, a grooved guide extending in a direction parallel to the direction of the guide measure, and a stop mounted for sliding movement in the grooved guide and adapted to co-operate with the guide measure.

14. In a device of the class described, a guide measure, a grooved guide extending in a direction parallel to the direction of the guide measure, a plurality of spacing blocks co-operating with the guide measure, and a slidable stop mounted for sliding movement in the grooved guide.

15. In a device of the class described, a guide measure, a grooved guide extending in a direction parallel to the direction of the guide measure, and angularly positioned with respect thereto, a slidable stop mounted for sliding movement in the grooved guide and provided with an angular portion adapted to co-operate with the guide measure.

16. A glass cutting table provided along certain of its side edges with guide measures and slidable stops cooperating therewith for accurately measuring the glass to be cut and provided with a plurality of parallel elongated openings formed therein to facilitate the placing of the glass upon the table and the removal of the same therefrom.

17. In a glass cutting table, a plurality of guide measures, a sliding stop cooperating with each guide measure, means on each stop for determining the lines along which the glass is to be cut, and a plurality of spacing blocks cooperating with certain of said guide measures.

18. In a glass cutting table, a plurality of guide measures, a sliding stop cooperating with each guide measure, means on each stop for determining the lines along which the glass is to be cut, and fixed and slidable spacing blocks cooperating with certain of said guide measures.

In testimony whereof, I affix my signature.

HARRY M. BARBEAU.